US011950640B1

(12) United States Patent
Chen

(10) Patent No.: US 11,950,640 B1
(45) Date of Patent: Apr. 9, 2024

(54) CHEST PATCH COMPONENT AND USE METHOD THEREOF

(71) Applicant: Shenzhen Shenmo Technology Co., Ltd., Shenzhen (CN)

(72) Inventor: Yiyue Chen, Puning (CN)

(73) Assignee: Shenzhen Shenmo Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/365,779

(22) Filed: Aug. 4, 2023

(51) Int. Cl.
*A61H 7/00* (2006.01)
*A41C 3/00* (2006.01)
*A41C 3/06* (2006.01)
*A61M 35/00* (2006.01)

(52) U.S. Cl.
CPC .............. *A41C 3/065* (2013.01); *A41C 3/005* (2013.01); *A61H 7/00* (2013.01); *A61H 2205/082* (2013.01)

(58) Field of Classification Search
CPC ................ A61H 7/00; A61H 2205/082; A61H 2201/105; A41C 3/065; A41C 3/066; A41C 3/0064; A61F 2013/0091; A61F 2013/00285; A61F 2013/00646; A61F 3/0063; A61F 3/8405; A61F 13/14; A61M 1/0697; A61M 5/14248; A61M 2005/3022; A61M 2210/1007; A61M 35/10
See application file for complete search history.

(56) References Cited

U.S. PATENT DOCUMENTS

| | | | | | |
|---|---|---|---|---|---|
| 3,035,571 | A * | 5/1962 | Jones | ...................... | A61H 23/02 D2/708 |
| 3,291,123 | A * | 12/1966 | Terauchi | ............ | A61H 23/0263 601/71 |
| 5,997,380 | A * | 12/1999 | Yang | ...................... | A41C 3/144 623/7 |
| 11,247,032 | B1 * | 2/2022 | Knas | ..................... | A61M 35/10 |

(Continued)

FOREIGN PATENT DOCUMENTS

| | | |
|---|---|---|
| CN | 211510606 U | 9/2020 |
| CN | 213307472 U | 6/2021 |
| CN | 215025324 U | 12/2021 |

OTHER PUBLICATIONS

English translation of CN 116327573 A (Year: 2023).*

(Continued)

*Primary Examiner* — Justine R Yu
*Assistant Examiner* — Christopher E Miller
(74) *Attorney, Agent, or Firm* — Nitin Kaushik

(57) ABSTRACT

A chest patch component and a use method thereof are disclosed according to the present application, and belonging to the technical field of chest patches, including: a chest patch body, a cross-sectional area of the chest patch body is arranged in an arc shape; a detachable massage module arranged at one side of the chest patch body, where the detachable massage module is mounted on a convex part of the chest patch body; a mounting component arranged between the chest patch body and the detachable massage module, the chest patch component disclosed by the present application is mainly composed of a chest patch body, a detachable massage module, a mounting groove, an anti-bacterial structure, a covering cushion layer, a close-fitting cloth cover and other main structures.

9 Claims, 10 Drawing Sheets

(56) References Cited

U.S. PATENT DOCUMENTS

| | | | | |
|---|---|---|---|---|
| 2016/0058645 A1* | 3/2016 | Tsai | .................. | A61H 15/0078<br>601/112 |
| 2021/0402204 A1* | 12/2021 | Rao | ......................... | A61N 7/00 |

OTHER PUBLICATIONS

English translation of CN 114794596 A (Year: 2022).*
English translation of CN 114129346 A (Year: 2022).*
English translation of CN 215080886 U (Year: 2021).*
English translation of CN 112546442 A (Year: 2021).*
English translation of CN 112402220 A (Year: 2021).*
English translation of CN 112137187 A (Year: 2020).*
English translation of CN 112057318 A (Year: 2020).*
English translation of CN 111345993 A (Year: 2020).*
English translation of CN 105726284 A (Year: 2016).*
CN 111345993 A (Year: 2020).*
CN 116327573 A (Year: 2023).*
CN 113101168 A (Year: 2021).*
CN 114129346 A (Year: 2022).*
CN 112057318 A (Year: 2020).*
CN 112137187 A (Year: 2020).*
CN 215080886 U (Year: 2021).*
CN 112402220 A (Year: 2021).*
CN 112546442 A (Year: 2021).*
CN 114794596 A (Year: 2022).*
CN 213404886 U (Year: 2021).*
CN 105726284 A (Year: 2016).*

* cited by examiner

CHEST PATCH COMPONENT AND USE METHOD THEREOF

TECHNICAL FIELD

The present application relates to the technical field of chest patch, and in particular to a chest patch component, the present application further relates to a use method of chest patch component.

BACKGROUND

With the progress of the times, women need to frequently attend various types of venues, so female bras have begun to change with the different clothing of women, and women often need to wear dresses and other clothing when attending important meetings and banquets, which often cannot be paired with traditional bras, so invisible bra stickers are needed.

China patent with publication number of CN217851403U discloses a soft support chest patch, which belongs to the field of soft support chest patches, and includes a chest patch cover, a connecting structure and a soft support skeleton. The two chest covers are symmetrically connected along the left and right direction through the connecting structure, the soft support skeleton is embedded in the chest patch cover near the lower edge, the chest patch cover is an arc-shaped cover structure that conforms to the curve of the female chest, the soft support skeleton is a flexible structure, and the strength of the arc on the soft support skeleton that matches the shape of the lower edge of the chest patch cover is greater than the strength of the chest patch cover. The chest patch cover may be worn on a woman's chest by adhesive, or when the chest patch cover is made of silica gel, it may be worn on the woman's chest by its own adsorption and friction. Two chest patches can be connected through a connecting structure, which is easy to disassemble when storing and has a strong overall connection when in use, the soft support skeleton located inside the chest patch may support the lower part of the chest of the wearing woman, preventing chest sagging.

The chest patches mentioned in the above patents and currently available in the market often require adhesive substances such as glue to be attached to the user's chest, and this adhesive substance has chemical properties and is accompanied by certain bacteria, which may affect the health of the user's chest skin; moreover, the functionality of chest patches in conventional technology is relatively single, and they do not have massage function, making it impossible to massage the wearer according to their needs during the wearing process.

Therefore, a chest patch component and usage method thereof are proposed to solve the problems existing in the conventional technology, enabling it to have antibacterial and massage functions.

SUMMARY

An object of the present application is to provide a chest patch component and usage method thereof, so as to solve the problem of the background technology mentioned above, that is, the chest patches mentioned in the above patents and currently available in the market often require adhesive substances such as glue to be attached to the user's chest, and this adhesive substance has chemical properties and is accompanied by certain bacteria, which may affect the health of the user's chest skin; moreover, the functionality of chest patches in conventional technology is relatively single, and they do not have massage function, making it impossible to massage the wearer according to their needs during the wearing process.

In order to achieve the above object, the following technical solution is adopted according to the present application:

A chest patch component, including: a chest patch body, a cross-sectional area of the chest patch body is arranged in an arc shape; a detachable massage module arranged at one side of the chest patch body, where the detachable massage module is mounted on a convex part of the chest patch body; a mounting component arranged between the chest patch body and the detachable massage module, and the detachable massage module is mounted on the convex part of the chest patch body through the mounting component; a mounting groove defined on the surface of the chest patch body; an antibacterial structure mounted in an inner cavity of the mounting groove; a clamping component arranged between the antibacterial structure and the mounting groove, wherein the antibacterial structure is fixed to the inner cavity of the mounting groove by clamping through the clamping component; and a covering cushion layer arranged at one side of the detachable massage module, and one side of the covering cushion layer is mounted on the surface of the chest patch body.

Preferably, the antibacterial structure includes: a medicine storage shell arranged in the inner cavity of the mounting groove; a plug threaded to one side of the medicine storage shell, and a side of the plug that is far away from the medicine storage shell is arranged in an arc shape that is suitable for the chest patch body; and a through hole defined on one side of the medicine storage shell.

Preferably, the clamping component includes: a clamping column fixedly mounted on a surface of the medicine storage shell; and a clamping groove defined on an inner wall of the mounting groove, the clamping groove is correspondingly arranged with the clamping column, and one end of the clamping column far away from the medicine storage shell is clamped with an inner wall of the clamping groove.

Preferably, the detachable massage module includes: an arc-shaped connecting block arranged at one side of the chest patch body; a connecting groove defined in an inner cavity of the arc-shaped connecting block; a plug-in groove defined in the chest patch body; two groups of massage grippers inserted into an inner cavity of the plug-in groove, the two groups of massage grippers are symmetrically arranged, and are arranged in an arc shape which is adapted to the chest patch body; a connecting rod fixedly connected to one end of the massage gripper, one end of the connecting rod penetrates through the arc-shaped connecting block and extends to an inner cavity of the connecting groove; and a driving component mounted in the inner cavity of the connecting groove and used for driving the massage gripper to move.

Preferably, the driving component includes: a driving motor fixedly mounted in the inner cavity of the connecting groove; a driving screw mounted on an output shaft of the driving motor, one end of the driving screw away from the driving motor is rotatably connected to an inner wall of the connecting groove; two groups of sliding blocks matched with the driving screw; a hinge for movably connecting the connecting rod and the sliding block together; and a movable support component for positioning a use position of the connecting rod.

Preferably, the movable support component includes: a through groove defined on a surface of the arc-shaped connecting block, one end of the through groove is communicated with the surface of the connecting groove, and the surface of the connecting rod is movably connected with an inner cavity of the through groove; and a support shaft movably connected with the connecting rod, and both ends of the support shaft are rotatably connected with an inner wall of the through groove.

Preferably, the chest patch component further includes two groups of external threads engraved on the surface of the driving screw, and the two groups of external threads are arranged in opposite directions.

Preferably, the mounting component includes: a clamping block fixedly mounted at one side of the arc-shaped connecting block; and a clamping hole defined on the surface of the chest patch body, the clamping hole and the clamping block are correspondingly arranged, and a surface of the clamping block is clamped with an inner wall of the clamping hole.

Preferably, the mounting component further includes a close-fitting cloth cover sleeved on the chest patch body, the arc-shaped connecting block and the surface of the covering cushion layer, and an adhesive rubber ring is mounted on one side of the close-fitting cloth cover.

Based on the chest patch component, a use method of the chest patch component is further disclosed according to the present application, which includes the following steps:

S1, putting bacteriostatic medicinal materials into the inner cavity of the medicine storage shell, and tightening the plug;

S2, mounting a medicine storage shell filled with bacteriostatic medicinal materials in the inner cavity of the mounting groove, and fixing the medicine storage shell in the inner cavity of the mounting groove by clamping through a clamping component;

S3, when the massage function is needed, inserting the massage gripper into the inner cavity of the plug-in groove, and fixing the arc-shaped connecting block and the chest patch body together through the mounting component by clamping;

S4, fixing the covering cushion layer on the surface of the arc-shaped connecting block by adhesive bonding;

S5, sleeving the close-fitting cloth cover on the surface of the chest patch body, the arc-shaped connecting block and the covering cushion layer, and fixing the close-fitting cloth cover through a zipper;

S6, putting the chest patch body on the user's body through the adhesive rubber ring, massaging the user through the detachable massage module, and performing bacteriostatic treatment on the contact part of the chest patch body and the user's body through the bacteriostatic structure.

Technical effects and advantages of the present application: compared with the conventional technology, the chest patch component and the using method thereof provided by the present application have the following advantages:

1. The chest patch component disclosed by the present application is mainly composed of a chest patch body, a detachable massage module, a mounting groove, an antibacterial structure, a covering cushion layer, a close-fitting cloth cover and other main structures. Its modular design has the advantage of flexible use, and the multifunctional chest patch may play an antibacterial role during wearing, preventing the user's health from being affected by wearing the chest patch for a long time. Meanwhile, in the wearing process, the user may also be massaged, which solves the defect of single function of the existing chest patch to a certain extent;

2. According to the present application, the detachable massage module may be mounted on one side of the chest patch body by arranging the mounting component, and after the detachable massage module is mounted, the irregular connection gap between the chest patch body and the detachable massage module may be supplemented by the coating cushion layer to ensure the smoothness of the whole product surface;

3. Through the arrangement of the clamping component, the bacteriostatic structure can be fixed in the inner cavity of the mounting groove for fixing the use position of the bacteriostatic structure, by setting the adhesive rubber ring, the product may be worn on the user's body, and the close-fitting cloth cover in this device is fixed by zipper or hook and loop.

Figure 1:
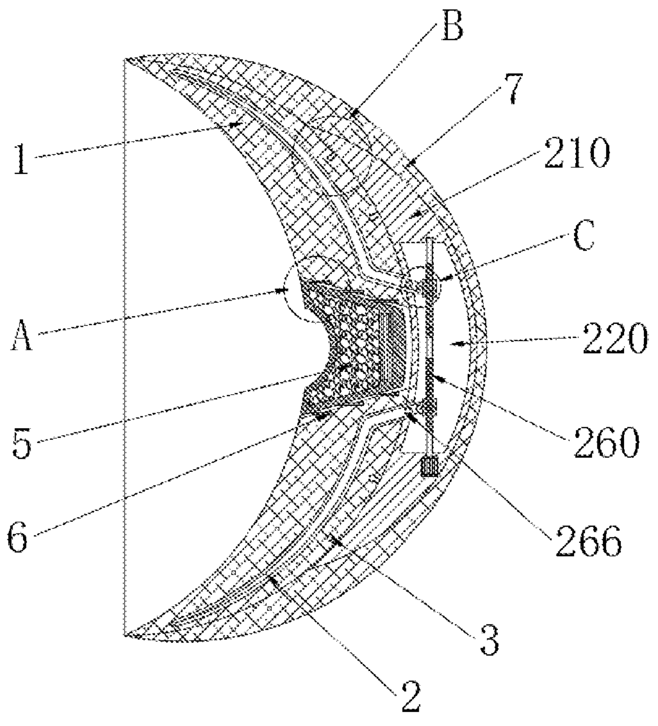
FIG. 1 is a schematic structural diagram of a chest patch component in an embodiment of the present application.
Figure 2:
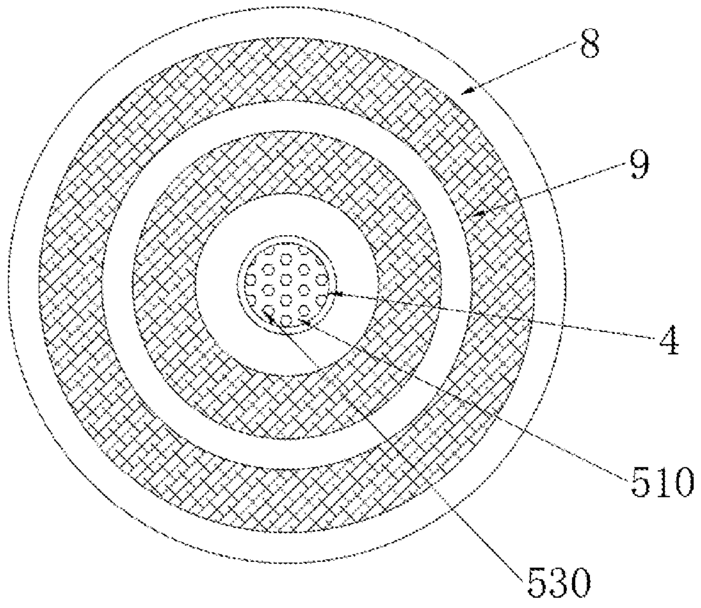
FIG. 2 is a schematic structural diagram of the adhesive rubber ring in the embodiment of the present application.

In the drawings: 1, chest patch body; 110, convex part;

2, detachable massage module; 210, arc-shaped connecting block; 220, connecting groove; 230, plug-in groove; 240, massage gripper; 250, connecting rod;

260, driving component; 261, driving motor; 262, driving screw; 263, sliding block; 264, hinge; 265, external thread;

266, movable support component; 2661, through groove; 2662, support shaft;

3, mounting component; 310, clamping block; 320, clamping hole;

4, mounting groove;

5, antibacterial structure; 510, medicine storage shell; 520, plug; 530, through hole;

6, clamping component; 610, clamping column; 620, clamping groove;

7, covering cushion layer;

8, close-fitting cloth cover;

9, adhesive rubber ring;

10, plugging block.

DETAILED DESCRIPTION OF THE EMBODIMENTS

The following may provide a clear and complete description of the technical solution in the embodiments of the present application, in conjunction with the accompanying drawings. Obviously, the described embodiments are only a part of the embodiments of the present application, not all of them. The specific embodiments described here are only intended to explain the present application and are not intended to limit it. Based on the embodiments in the present application, all other embodiments obtained by ordinary technicians in the art without creative labor fall within the scope of protection of the present application.

A chest patch component is disclosed according to the present application, as shown in FIG. 1, includes a chest patch body 1, a detachable massage module 2, a mounting component 3, a mounting groove 4, an antibacterial structure 5, a clamping component 6 and a covering cushion layer 7.

Specifically, a cross-sectional area of the chest patch body 1 is arranged in an arc shape; a detachable massage module 2 is mounted on a convex part (110) of the chest patch body 1, and the detachable massage module 2 is mounted on the convex part (110) of the chest patch body 1 through the mounting component 3; a mounting groove 4 defined on the surface of the chest patch body 1; an antibacterial structure 5 mounted in an inner cavity of the mounting groove 4, and the antibacterial structure is fixed to the inner cavity of the mounting groove 4 by clamping through the clamping component 6, and one side of the covering cushion layer 7 is mounted on the surface of the chest patch body 1.

Figure 5:
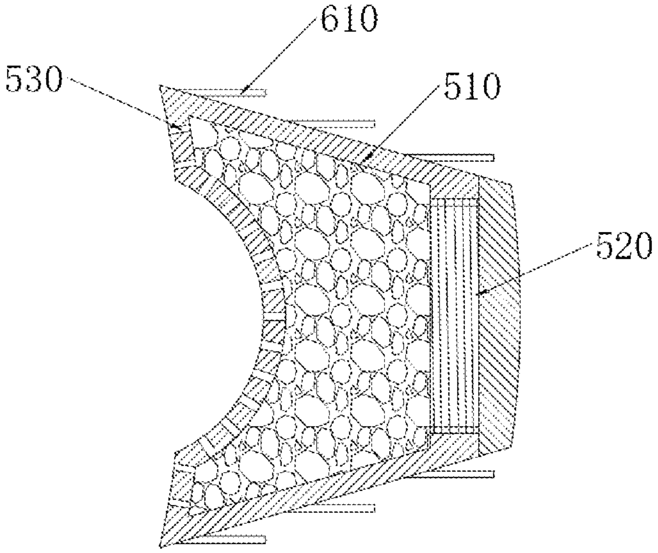
FIG. 5 is a schematic structural diagram of an antibacterial structure in the embodiment of the present application.
Figure 6:
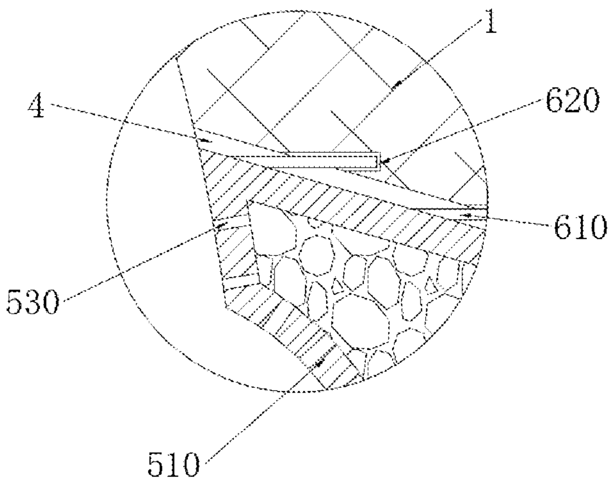
FIG. 6 is an enlarged view at A in FIG. 1.

Illustratively, as shown in FIG. 5 and FIG. 6, the antibacterial structure 5 includes: a medicine storage shell 510 arranged in the inner cavity of the mounting groove 4; a plug 520 threaded to one side of the medicine storage shell 510, and a side of the plug 520 that is far away from the medicine storage shell 510 is arranged in an arc shape that is suitable for the chest patch body 1; and a through hole 530 defined on one side of the medicine storage shell 510.

The antibacterial structure 5 may play a bacteriostatic role on the contact part between the product and the user's body, and prevent the risk of bacterial infection caused by wearing the chest patch body 1 for a long time. In this embodiment, the bacteriostatic drug is filled in the inner cavity of the medicine storage shell 510. After the bacteriostatic drug is filled in the inner cavity of the medicine storage shell 510, the user may tighten the plug 520 to fix the drug in the inner cavity of the medicine storage shell 510.

It should be noted that in this embodiment, one side of the plug 520 is arranged in an arc shape that is suitable for the chest patch body 1, which may improve the overall smoothness of the product and prevent unevenness on the surface of the product, meanwhile, in this embodiment, a through hole 530 is defined on one side of the medicine storage shell 510, which may enable antibacterial drugs to contact the user's skin through the through hole 530, it should be noted that in this embodiment, an aperture of the through hole 530 is set to 0.2 to 0.5 mm, which may ensure ventilation and prevent the medicine inside the medicine storage shell 510 from leaking out.

In this embodiment, antibacterial drugs refer to drugs that only inhibit the growth and reproduction of bacteria without killing bacteria, such as tetracycline, erythromycin and sulfonamides.

In order to mount the antibacterial structure 5 in the inner cavity of the installation groove 4, the clamping component 6 shown in FIG. 6 is disclosed in this embodiment. The clamping component 6 includes a clamping column 610 fixedly mounted on the surface of the medicine storage shell 510; and a clamping groove 620 defined on an inner wall of the mounting groove 4, the clamping groove 620 is correspondingly arranged with the clamping column 610, and one end of the clamping column 610 far away from the medicine storage shell 510 is clamped with an inner wall of the clamping groove 620.

Specifically, through the arrangement of the clamping component 6, the medicine storage shell 510 may be mounted in the inner cavity of the mounting groove 4 by clamping, during installation, the user may insert the medicine storage shell 510 containing antibacterial drugs into the inner cavity of the mounting groove 4, during the movement of the medicine storage shell 510, the clamping column 610 on its surface is driven to move, and the clamping column 610 is inserted into the inner cavity of the clamping groove 620. In case that the medicine storage shell 510 is completely inserted into the inner cavity of the mounting groove 4, the clamping column 610 may also be completely clamped into the inner cavity of the clamping groove 620, thereby fixing the use position of the medicine storage shell 510 by clamping.

Figure 7:
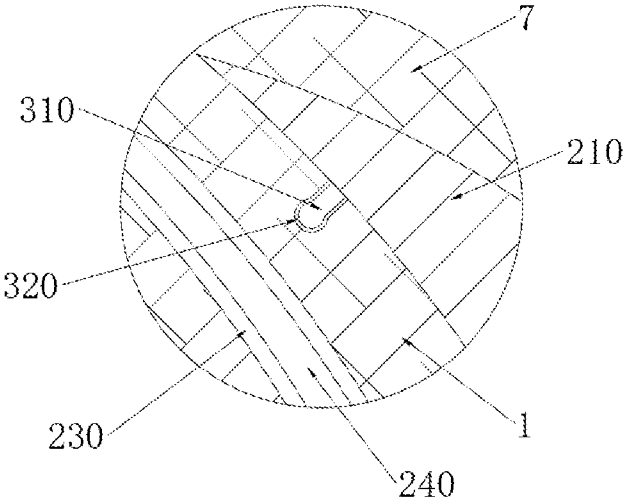
FIG. 7 is an enlarged view at B in FIG. 1.
Figure 10:
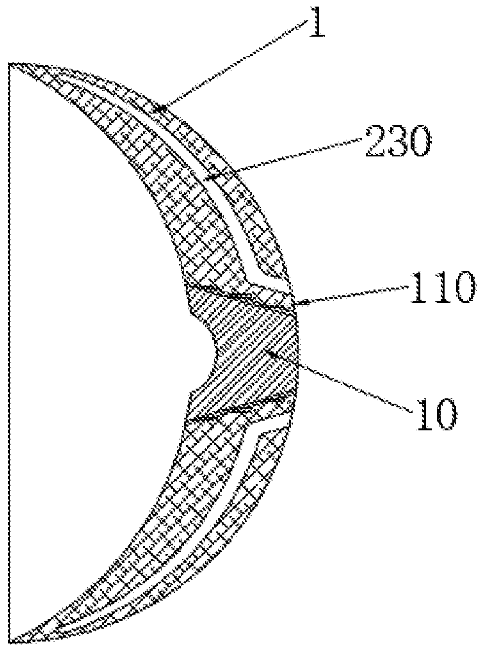
FIG. 10 is a schematic structural diagram of a plugging block in other embodiments of the present application.

In order to make the chest patch body 1 in this embodiment have massage function, a detachable massage module 2 is further disclosed in this embodiment, as shown in FIG. 1, FIG. 7 and FIG. 10. The detachable massage module 2 includes: an arc-shaped connecting block 210 arranged at one side of the chest patch body 1; a connecting groove 220 defined in an inner cavity of the arc-shaped connecting block 210; a plug-in groove 230 defined in the chest patch body 1; two groups of massage grippers 240 inserted into an inner cavity of the plug-in groove 230, the two groups of massage grippers 240 are symmetrically arranged, and are arranged in an arc shape which is adapted to the chest patch body 1; a connecting rod 250 fixedly connected to one end of the massage gripper 240, one end of the connecting rod 250 penetrates through the arc-shaped connecting block 210 and extends to an inner cavity of the connecting groove 220; and a driving component 260 mounted in the inner cavity of the connecting groove 220 and used for driving the massage gripper 240 to move.

Through the arrangement of the detachable massage module 2, when the user needs to use the massage function, the driving component 260 may be turned on through an external controller. The driving component 260 may drive the massage gripper 240 to move through the connecting rod 250, thereby achieving the function of massaging users.

Figure 4:
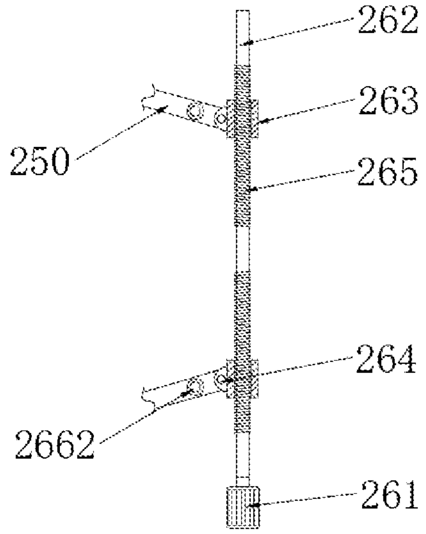
FIG. 4 is a schematic structural diagram of a driving component in the embodiment of the present application.
Figure 8:
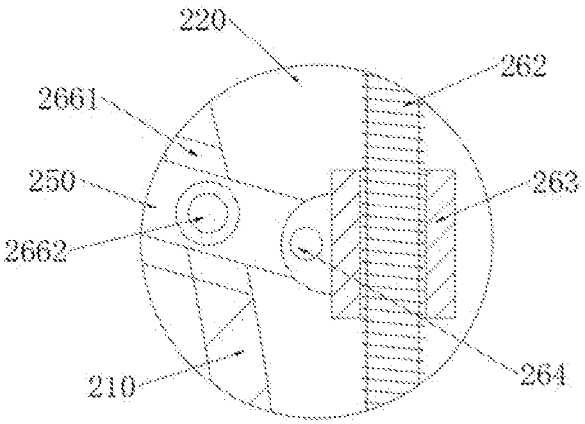
FIG. 8 is an enlarged view at C in FIG. 1.

Preferably, in order to drive the massage gripper 240 to move and provide massage to the user, a driving component 260 is further disclosed according to this embodiment, as shown in FIG. 4 and FIG. 8, the driving component 260 includes a driving motor 261 fixedly mounted in the inner cavity of the connecting groove 220; a driving screw 262 mounted on an output shaft of the driving motor 261, one end of the driving screw 262 away from the driving motor 261 is rotatably connected to an inner wall of the connecting groove 220; two groups of sliding blocks 263 matched with the driving screw 262; a hinge 264 for movably connecting the connecting rod 250 and the sliding block 263 together; and a movable support component 266 for positioning a use position of the connecting rod 250.

Further, as shown in FIG. 4, the chest patch component in this embodiment further includes two groups of external threads 265 engraved on the surface of the driving screw 262, and the two groups of external threads 265 are arranged in opposite directions.

Specifically, through the arrangement of the driving component 260, during massage, the user may turn on the driving motor 261 through the external controller, and an output shaft of the driving motor 261 may drive the driving screw 262 to rotate. Because the surface of the driving screw 262 is engraved with two groups of external threads 265 with opposite directions, the two groups of sliding blocks 263 may be driven to move in opposite directions when the driving screw 262 rotates, thereby driving the massage gripper 240 to open and close. In this embodiment, the driving motor 261 is a servo motor, which may realize the function of forward and reverse rotation, so as to drive the massage gripper 240 to open and close.

It is worth noting that, as shown in FIG. 8, the movable support component 266 in this embodiment includes: a through groove 2661 defined on a surface of the arc-shaped connecting block 210, one end of the through groove 2661 is communicated with the surface of the connecting groove 220, and the surface of the connecting rod 250 is movably connected with an inner cavity of the through groove 2661; and a support shaft 2662 movably connected with the connecting rod 250, and both ends of the support shaft 2662 are rotatably connected with an inner wall of the through groove 2661.

The movable support component 266 may support the connecting rod 250, in case that the sliding block 263 moves, it may drive the connecting rod 250 to rotate with the support shaft 2662 as the axis, thereby driving the massage gripper 240 to move, and driving the massage gripper 240 to open and close for user massage.

Further, as shown in FIG. 7, in order to mount the detachable massage module 2 on the surface of the chest patch body 1, the mounting component 3 in this embodiment includes a clamping block 310 fixedly mounted at one side of the arc-shaped connecting block 210; and a clamping hole 320 defined on the surface of the chest patch body 1, the clamping hole 320 and the clamping block 310 are correspondingly arranged, and a surface of the clamping block 310 is clamped with an inner wall of the clamping hole 320.

Through the arrangement of the mounting component 3, the detachable massage module 2 may be mounted on the chest patch body 1, during installation, the user may insert the massage gripper 240 into the plug-in groove 230 inside the chest patch body 1, in case that the massage gripper 240 is completely inserted into the inner cavity of the plug-in groove 230, one side of the arc-shaped connecting block 210 is attached to the surface of the chest patch body 1.

In case that the arc-shaped connecting block 210 moves, it may drive the clamping block 310 to move, in case that one side of the arc-shaped connecting block 210 is attached to the surface of the chest patch body 1, the clamping block 310 may be completely clamped into the clamping hole 320 on the surface of the chest patch body 1, thus achieving the purpose of fixing the arc-shaped connecting block 210 on the surface of the chest patch body 1 by clamping.

Figure 9:
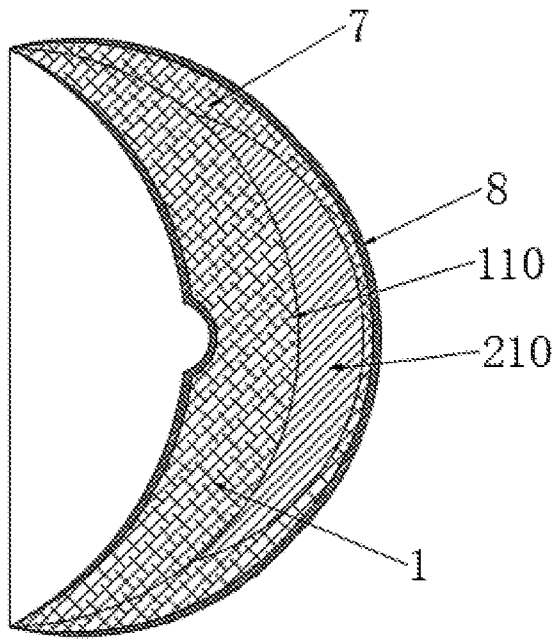
FIG. 9 is a schematic structural diagram of a close-fitting cloth cover in the embodiment of the present application.

It should be noted that, as shown in FIG. 9, the chest patch component in this embodiment further includes a close-fitting cloth cover 8 sleeved on the chest patch body 1, the arc-shaped connecting block 210 and the surface of the covering cushion layer 7, and an adhesive rubber ring 9 is mounted on one side of the close-fitting cloth cover 8.

Specifically, by providing the close-fitting cloth cover 8, the chest patch body 1, arc-shaped connecting block 210, and covering cushion layer 7 may be wrapped inside, making the close-fitting cloth cover 8 contact the user's skin and have good air permeability. It should be noted that in this embodiment, the close-fitting cloth cover 8 is bonded and fixed by zipper or hook and loop, and the product may be worn on the user's body through the arrangement of the adhesive rubber ring 9. Specifically, the adhesive rubber ring 9 is made of medical nano antibacterial glue, which has the advantages of no pain when torn off, no residue on the skin after sticking, no drop when sweating in water, and good glue extensibility.

Figure 3:
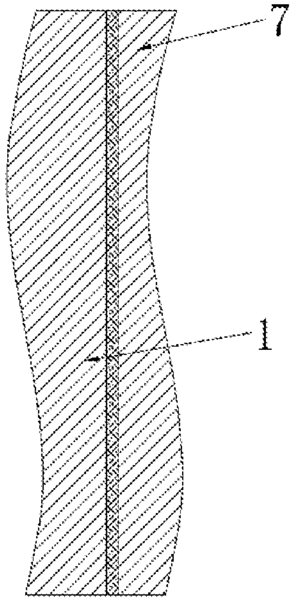
FIG. 3 is a schematic diagram of a connection structure between a covering cushion layer and a chest patch body in the embodiment of the present application.

It should also be noted that in this embodiment, the covering cushion layer 7 and the chest patch body 1 are bonded together by glue, as shown in FIG. 3, which can be reused, such as pressure sensitive adhesive.

Further, the chest patch body 1, the arc-shaped connecting block 210 and the covering cushion layer 7 may be made of silica gel. Preferably, the chest patch body 1, the arc-shaped connecting block 210, the covering cushion layer 7 and the close-fitting cloth cover 8 may also be made of textile materials. More specifically, the textile is made of 40D superfine nylon yarn and 20D superfine spandex yarn, of which 87% is nylon and 13% is spandex. The textile has the advantages of ultra-thin, high elasticity and good air permeability.

Silica gel is a transparent or milky white granular solid with an open porous structure and strong adsorption ability, capable of adsorbing various substances. Dilute sulfuric acid (or hydrochloric acid) is added to the aqueous solution of water glass and left standing. The aqueous solution becomes an aqueous silicate gel and solidifies. The electrolyte Na+ and SO42-(Cl—) ions dissolved in the gel are removed by water washing, and silica gel can be obtained after drying. For example, some silica gels absorb about 40% or even 300% of water, which may be used for gas drying, gas absorption, liquid dehydration, chromatographic analysis, etc., and also as a catalyst. For example, when cobalt chloride is added to silica gel, it is blue when it is dried, and red when it absorbs water, and it can be reused.

Polyamide fibre generally refers to nylon, and the morphology and structure of polyamide fibre made by melt spinning method has a circular cross section and no special longitudinal structure. Filamentous fibril structure can be observed under electron microscope, and a fibril width of nylon 66 is about 10-15 nm. If a special-shaped spinneret is used, it can be made into polyamide fibre with various special cross-sectional shapes, such as polygonal, multi-leaf and hollow cross-sections. Its focused state structure is closely related to the stretching and heat treatment of the spinning process, and has the characteristics of light weight, excellent wrinkle resistance, good air permeability, and good durability, dyeing, and heat setting.

Spandex, short for polyurethane fiber, is an elastic fiber. Spandex is generally composed of multiple filaments, usually 10D per strand. Currently, there are 15D per strand, and even 20D per strand, the fewer the theoretical strands, the better the uniformity of the stripes, and the less the chance of overlapping forms. Spandex has excellent elasticity, but its strength is 2~3 times higher than the strength of latex yarn, its linear density is thinner, and it is more resistant to chemical degradation. Spandex has good acid and alkali resistance, sweat resistance, seawater resistance, dry cleaning resistance and wear resistance.

Generally, spandex is not used alone, but is mixed into the fabric in a small amount. This kind of fiber has both rubber properties and fiber properties, and is mostly used in core-spun yarns with spandex as the core yarn, called elastic core-spun yarns. The main characteristics of this type of yarn are: firstly, it may achieve good hand feel and appearance, and the outer fibers composed of natural fibers have good moisture absorption; secondly, high-quality elastic yarn may be produced using only 1-10% spandex filament; thirdly, the elasticity percentage control range is from 10% to 20%, and different elasticity values may be selected based on the product's purpose.

In other embodiments, as shown in FIG. 10, the inner cavity of the mounting groove 4 may also be provided with a plugging block 10 through the clamping component 6, in this embodiment, one side of the plugging block 10 is also arranged in an arc-shaped shape that is suitable for the chest patch body 1, which may ensure the flatness of the surface of the chest patch body 1, with the provision of the plugging block 10, the mounting groove 4 may be blocked by the plugging block 10 when the user does not need additional functions.

In other embodiments, in order to realize the antibacterial function of the chest patch, the following solution is disclosed: an antibacterial chest patch, includes a chest patch and a glue layer arranged inside the chest patch, where the chest patch has a composite layer structure; the composite layer structure is composed of antibacterial layer, sponge layer and breathable cloth layer from inside to outside, and the antibacterial layer is nylon spandex blended antibacterial layer; an upper side of the chest patch is an auxiliary breast extrusion area, which is convex, and the breathable cloth layer is a nylon-spandex blended layer; the sponge layer is a cloud cotton layer.

The chest patch includes a first chest patch and a second chest patch; the first chest patch is provided with a first fastener, and the second chest patch is provided with a second fastener; the first chest patch and the second chest patch are detachably connected through the first fastener and the second fastener respectively, and the second fastener is provided with a clamping groove and a clamping member arranged along an axial direction of the second fastener; the first fastener is provided with a bolt extending into the clamping groove; the clamping member is clamped with the bolt, and connecting grooves are respectively defined on the first fastener and the second fastener; the first chest patch is connected with the first fastener through the connecting groove of the first fastener, and the second chest patch is connected with the second fastener through the connecting groove of the second fastener.

The chest patch further includes a nipple protection patch; the nipple protection patch is arranged on the glue layer, and the nipple protection patch is a circular cloth piece; the circular cloth piece is made of a blend of nylon and spandex, and an upper end of the chest patch is in a crescent arc shape; a radian of the crescent arc is RAD, with a range of values ranging from 40° to 60°.

In the bacteriostatic chest patch involved in this embodiment, the structure of the chest patch is designed as a composite layer structure, and the composite layer is provided with a bacteriostatic layer, so that when the user uses the chest patch, the chest patch has a bacteriostatic effect, thereby protecting the health of the user's chest. In addition, an upper end of the chest patch is designed in a semi lunar shape, with an arc range of 40°-60°, which can make the chest patch more invisible when users wear clothing, the upper side of the chest patch is provided with a side breast compression area, which makes the chest patch more breathable and allows users to retract the side breast when wearing the patch, resulting in a better display of their body shape, this antibacterial chest patch has a simple structure, low production cost, and better effect.

Based on the chest patch component, a use method of the chest patch component is further disclosed in this embodiment, which includes the following steps:

S1, loading antibacterial medicinal materials into the inner cavity of the medicine storage shell 510, and tightening the plug 520;

S2, mounting the medicine storage shell 510 containing antibacterial medicinal materials in the inner cavity of the mounting groove 4, and fixing the medicine storage shell 510 in the inner cavity of the mounting groove 4 by clamping through the clamping component 6;

S3, in case that the massage function is needed, inserting the massage gripper 240 into the inner cavity of the plug-in groove 230, and fixing the arc-shaped connecting block 210 with the chest patch body 1 by clamping through the mounting component 3;

S4, bonding and fixing the covering cushion layer 7 on the surface of the arc-shaped connecting block 210 by glue;

S5, covering the close-fitting cloth cover 8 on the surface of the chest patch body 1, the arc-shaped connecting block 210 and the covering cushion layer 7, and fixing the close-fitting cloth cover 8 through a zipper;

S6, putting the chest patch body 1 on the user's body through the adhesive rubber ring 9, massaging the user through the detachable massage module 2, and performing bacteriostatic treatment on the contact part of the chest patch body 1 and the user's body through the antibacterial structure 5.

Finally, it should be explained that the above is only the preferred embodiment of the present application, and it is not used to limit the present application. Although the present application has been described in detail with reference to the foregoing embodiments, it is still possible for a person skilled in the art to modify the technical scheme described in the foregoing embodiments or to replace some technical features by equivalents. Any modification, equivalent replacement, improvement, etc. made within the spirit and principle of the present application should be included in the protection of the present application.

What is claimed is:

1. A chest patch component, comprising:

a chest patch body (1), a cross-sectional area of the chest patch body (1) is arranged in an arc shape;

a detachable massage module (2) arranged at one side of the chest patch body (1), wherein the detachable massage module (2) is mounted on a convex part (110) of the chest patch body (1);

a mounting component (3) arranged between the chest patch body (1) and the detachable massage module (2), and the detachable massage module (2) is mounted on the convex part (110) of the chest patch body (1) through the mounting component (3);

a mounting groove (4) defined on the surface of the chest patch body (1);

an antibacterial structure (5) comprising a medicine storage shell (510) arranged in an inner cavity of the mounting groove (4);

a clamping component (6) arranged between the antibacterial structure (5) and the mounting groove (4), wherein the antibacterial structure (5) is fixed to the inner cavity of the mounting groove (4) by clamping through the clamping component (6); and a covering cushion layer (7) arranged at one side of the detachable massage module (2), and one side of the covering cushion layer (7) is mounted on the surface of the chest patch body (1); wherein the detachable massage module (2) comprises:

an arc-shaped connecting block (210) arranged at one side of the chest patch body (1);

a connecting groove (220) defined in an inner cavity of the arc-shaped connecting block (210);

a plug-in groove (230) defined in the chest patch body (1);

two groups of massage grippers (240) inserted into an inner cavity of the plug-in groove (230), the two groups of massage grippers (240) are symmetrically arranged, and are arranged in an arc shape which is adapted to the chest patch body (1);

a connecting rod (250) fixedly connected to one end of the two groups of massage grippers (240), one end of the connecting rod (250) penetrates through the arc-shaped connecting block (210) and extends to an inner cavity of the connecting groove (220); and a driving component (260) mounted in the inner cavity of the connecting groove (220) and used for driving the two groups of massage grippers (240) to move.

2. The chest patch component according to claim 1, wherein the antibacterial structure further comprises:

a plug (520) threaded to one side of the medicine storage shell (510), and an external side of the plug (520) is arranged in a convex arc shape; and a through hole (530) is defined on one side of the medicine storage shell (510).

3. The chest patch component according to claim 2, wherein the clamping component comprises:

a clamping column (610) fixedly mounted on a surface of the medicine storage shell (510); and a clamping groove (620) defined on an inner wall of the mounting groove (4), the clamping groove (620) is correspondingly arranged with the clamping column (610), and one end of the clamping column (610) extending away from the medicine storage shell (510) is clamped with an inner wall of the clamping groove (620).

4. The chest patch component according to claim 1, wherein the driving component (260) comprises:

a driving motor (261) fixedly mounted in the inner cavity of the connecting groove (220);

a driving screw (262) mounted on an output shaft of the driving motor (261), one end of the driving screw (262) away from the driving motor (261) is rotatably connected to an inner wall of the connecting groove (220);

two groups of sliding blocks (263) matched with the driving screw (262);

a hinge (264) for movably connecting the connecting rod (250) and the sliding block (263) together; and a movable support component (266) for positioning a use position of the connecting rod (250).

5. The chest patch component according to claim 4, wherein the movable support component (266) comprises:

a through groove (2661) defined on a surface of the arc-shaped connecting block (210), one end of the through groove (2661) is communicated with the surface of the connecting groove (220), and the surface of the connecting rod (250) is movably connected with an inner cavity of the through groove (2661); and a support shaft (2662) movably connected with the connecting rod (250), and both ends of the support shaft (2662) are rotatably connected with an inner wall of the through groove (2661).

6. The chest patch component according to claim 4, further comprises two groups of external threads (265) engraved on the surface of the driving screw (262), and the two groups of external threads (265) are arranged in opposite directions.

7. The chest patch component according to claim 4, wherein the mounting component comprises:

a clamping block (310) fixedly mounted at one side of the arc-shaped connecting block (210); and a clamping hole (320) defined on the surface of the chest patch body (1), the clamping hole (320) and the clamping block (310) are correspondingly arranged, and a surface of the clamping block (310) is clamped with an inner wall of the clamping hole (320).

8. The chest patch component according to claim 1, further comprising a close-fitting cloth cover (8) sleeved on the chest patch body (1), the arc-shaped connecting block (210) and the surface of the covering cushion layer (7), wherein an adhesive rubber ring (9) is mounted on one side of the close-fitting cloth cover (8).

9. A method of using the chest patch component according to claim 1, comprising the following steps:

S1, putting bacteriostatic medicinal materials into the inner cavity of the medicine storage shell, and tightening a plug threaded to one side of the medicine storage shell;

S2, mounting the medicine storage shell filled with bacteriostatic medicinal materials in the inner cavity of the mounting groove, and fixing the medicine storage shell in the inner cavity of the mounting groove by clamping through the clamping component;

S3, when the massage function is needed, inserting the two groups of massage grippers into the inner cavity of the plug-in groove, and fixing the arc-shaped connecting block and the chest patch body together through the mounting component by clamping;

S4, fixing the covering cushion layer on the surface of the arc-shaped connecting block by adhesive bonding;

S5, sleeving the close-fitting cloth cover on the surface of the chest patch body, the arc-shaped connecting block and the covering cushion layer, and fixing the close-fitting cloth cover through a zipper;

S6, putting the chest patch body on the user's body through an adhesive rubber ring, massaging the user through the detachable massage module, and performing bacteriostatic treatment on the contact part of the chest patch body and the user's body through the bacteriostatic structure.

* * * * *